United States Patent

Drake

[15] 3,641,476

[45] Feb. 8, 1972

[54] TELEPHONE TERMINAL CLIP-ON PROTECTOR

[72] Inventor: King B. Drake, Los Angeles, Calif.

[73] Assignee: Dracon Industries, Chatsworth, Calif.

[22] Filed: Mar. 12, 1970

[21] Appl. No.: 18,831

[52] U.S. Cl. ....................339/36, 174/138.4

[51] Int. Cl. ....................H01r 13/44, H01r 13/60

[58] Field of Search ............174/5, 138.4, 60; 339/36, 198.2, 339/198.3, 198.4, 198.5, 116

[56] References Cited

UNITED STATES PATENTS

| | | | |
|---|---|---|---|
| 3,329,927 | 7/1967 | Ayers | 339/36 X |
| 3,407,264 | 10/1968 | Cull | 339/198.2 X |

*Primary Examiner*—Marvin A. Champion
*Assistant Examiner*—Terrell P. Leurs
*Attorney*—Allan M. Shapiro

[57] ABSTRACT

The telephone terminal clip-on protector has a pair of opposed engagement jaws which are integrally formed together with a protection flange so that, when the jaws engage a telephone terminal, the flange extends over adjacent terminals to protect the terminals and to protect workers from being scratched by the terminals.

11 Claims, 5 Drawing Figures

INVENTOR.
KING B. DRAKE
BY Allan M. Shapiro
ATTORNEY

TELEPHONE TERMINAL CLIP-ON PROTECTOR

BACKGROUND OF THE INVENTION

1. Field of the Invention

This invention is directed to a telephone terminal clip-on protector where telephone terminals are protected from inadvertent damage and workers are protected from injury by the terminals.

2. Description of the Prior Art

Telephone equipment requires a multiplication of small structures. This is true both in the central office and in those places where cable is broken down into subsystems, such as the distribution points found on each floor of a large office building. Each of the many different kinds of telephone equipment require attachment of wires thereto, so that each telephone is appropriately connected through peripheral junctions to a cable, and the cable to the central office equipment. Modern technique of attachment of wires to this equipment calls for the wrap of the wire ends around terminal posts on the equipment. The terminal posts are stamped from sheet, to produce a terminal of rectangular cross section because, when the wire is wrapped thereon, the corners of the terminal deform the wire sufficiently to produce good electrical contact. These contacts are of long life and low resistance, so that no soldering is needed. Telephone equipment of that nature is employed in large quantities and must be closely spaced for the conservation of space. As a result, terminals of the nature described are closely adjacent to each other and even face each other across a fairly narrow space. This results in difficulty in manually reaching and operating upon any one of these terminals because of the sharpness of the terminals extending from the adjacent piece of equipment.

SUMMARY OF THE INVENTION

In order to aid in the understanding of this invention, it can be stated in essentially summary form that it is directed to a terminal protector which has opposing engagement jaws and an integrally formed terminal protection flange arranged so that, when the engagement jaws engage a terminal, the protection flange covers a plurality of adjacent terminals.

Accordingly, it is an object of this invention to provide a telephone terminal clip-on protector which mounts upon telephone terminals on telephone equipment so that the terminals are protected against accidental damage to the terminals and/or injury to the person working adjacent the terminals. It is a further object to provide a terminal protector which has first and second facing engagement jaws and an associated terminal protection flange so that the flange extends to protect telephone terminals when the engagement jaws are in place. It is still another object to provide a telephone terminal clip-on protector of uniform cross section so that it may be economically extruded from synthetic polymer composition material. It is still another object to provide a telephone terminal clip-on protector of resilient material of insulative character so that the installation of the telephone terminal clip-on protector does not cause inadvertent electrical connection.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

DESCRIPTION OF THE PREFERRED EMBODIMENT

Figure 1:
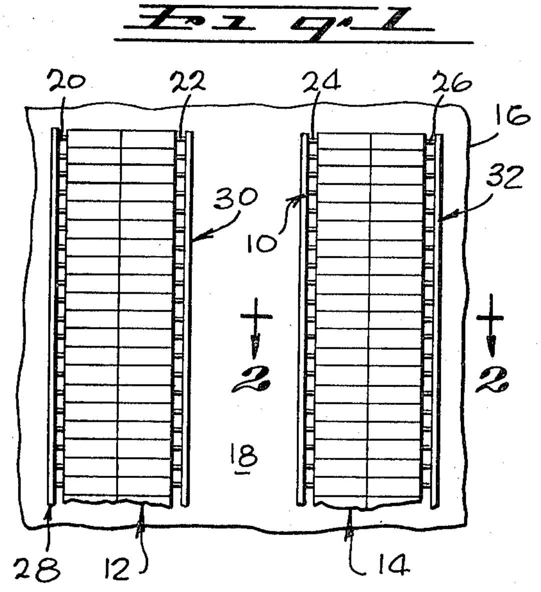
FIG. 1 is a fragmentary front elevational view of telephone equipment having terminals thereon.

One piece of the telephone terminal clip-on protector, in accordance with this invention, is generally indicated at 10 in the drawings. In FIG. 1, stacked telephone equipment is indicated at 12 and 14. The equipment is mounted as on a mounting board 16, in such a manner that there is space 18 between the telephone equipment. Telephone equipment 12 has rows and columns of terminals 20 and 22 on opposite sides thereof, while stacked telephone equipment 14 has rows and columns of telephone terminals 24 and 26 on the sides thereof. It is to be understood that the telephone equipment is arranged in a plurality of spaced rows so that there is a fairly narrow space adjacent most of the telephone terminals, for space conservation, while there is enough separation to allow manual access to the terminals for work thereon.

Telephone terminal clip-on protector 10 is mounted upon terminals 24, while identical telephone terminal clip-on protectors 28, 30 and 32 are respectively mounted on columnar terminals 20, 22 and 26.

Figure 3:
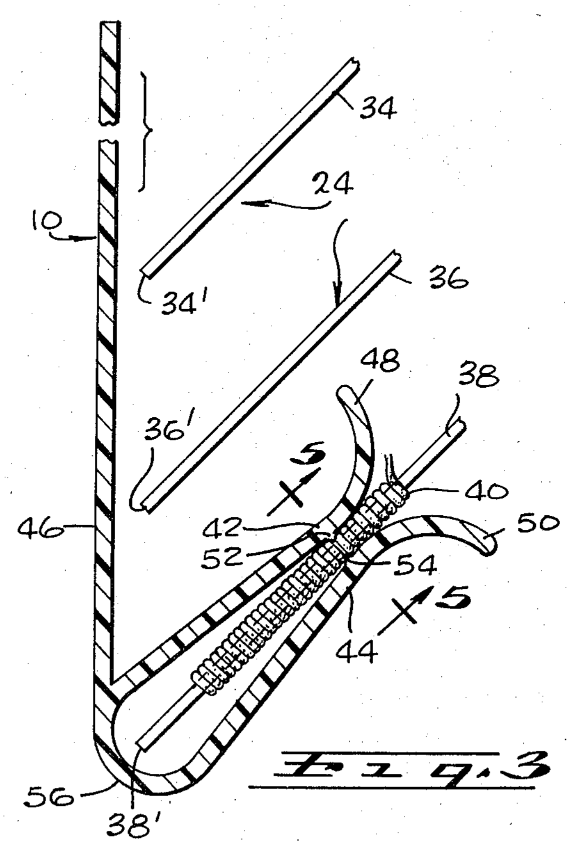
FIG. 3 is a further enlarged fragmentary view of the detail indicated at 3—3 in FIG. 2.
Figure 2:
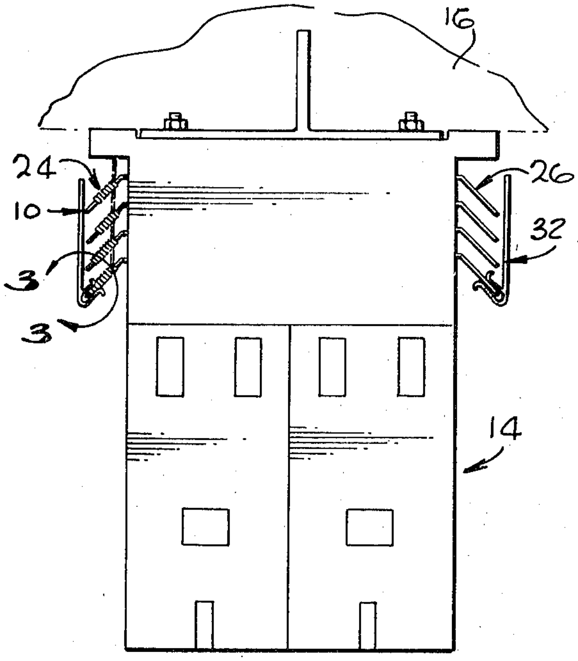
FIG. 2 is an enlarged horizontal section taken generally along the line 2—2 of FIG. 1.

As seen in FIG. 3, the terminals are arranged in columns, three of which are indicated at 34, 36 and 38, with individual ones of these terminals being arranged to receive a wrapping of bare wire, as at 40 in FIG. 3. As is well known in the telephone terminal art, the wire wrapping around such a rectangular cross section terminal makes a proper, long-life electrical connection, suitable for telephone usage.

Figure 4:
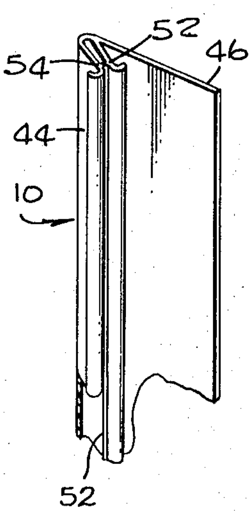
FIG. 4 is a perspective view, with parts broken away, of the telephone terminal clip-on protector of this invention.
Figure 5:
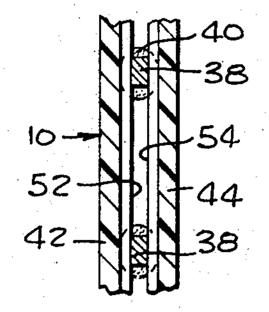
FIG. 5 is a vertical section, with parts broken away, taken generally along the line 5—5 of FIG. 3.

Each of the telephone terminal clip-on protectors 10, 28, 30 and 32 is of uniform cross section so that the protectors can be extruded from thermoplastic synthetic polymer composition material of a grade suitable for extrusion and preferably nonflammable, such as polyvinyl carbonate. Each of the terminal protectors illustrated is identical and protector 10 can best be described in detail by reference to FIGS. 3, 4 and 5. Engagement jaws 42 and 44 are integrally formed with flange 46. Engagement jaws 42 and 44 are generally symmetrical about a centerline, and column 38 of the terminals lies on the jaw centerline in FIG. 3. The engagement jaws have flared lips 48 and 50 which are curved outward to permit the engagement jaws to spread out over the terminals and any wires wrapped therearound. Grip ridges 52 and 54 are integrally formed with the jaws 42 and 44, respectively, during extrusion so that the grip ridges extend along the length thereof, as is best illustrated in FIG. 5. These grip ridges are fairly sharp so that they firmly engage the telephone terminals when the terminals are bare, and engage upon and between the wires thereon when such wires, as at 40, are wrapped upon the terminals. Flange 46 extends at an angle with respect to the center line of the jaws so that, when the protector is installed, the flange is positioned over the ends, as at 34' and 36', of adjacent terminals. When the terminals are arranged at an acute angle with respect to the plane of their ends, the angle between the flange and the centerline of the jaws is arranged at substantially the same angle. Thus, when the jaws grip a column of terminals, as at 38, the flange 46 lies substantially parallel to the plane of the terminal ends 34', 36' and 38', as is seen in FIG. 3.

In use, the telephone terminal clip-on protector 10 is cut to an appropriate length to correspond to the length of the telephone equipment or its terminal column to which the protector is to be attached. Thereupon, the jaws are engaged over one of the columns of terminals. The material of the protector 10 is electrically nonconducting to prevent undesirable electrical connection between terminals and is sufficiently flexible to permit the engagement jaws to snap over the column of terminals and over any wire wrapped thereon. So-called "rigid" polyvinyl chloride synthetic polymer composition material is sufficiently resilient in suitable wall thicknesses to be sufficiently flexible for this use and is preferred. Note that jaws 42 and 44 converge from their common and curved endwall 56 so that they function as leaf springs for maximizing the gripping force applied by the longitudinal grip ridges 52 and 54. Flange 46 is of sufficient width, in a direction lateral to the extruded length of the protector 10, to extend over a sufficient number of columns of terminals to protect them. The width of this flange depends upon the nature of equipment for which the protector 10 is designed; as indicated in FIG. 4, the particular design of the protector 10 is such as to permit the flange 46 to extend over four columns of terminals, including the columnar terminals engaged by the jaws.

With the protector in place, the terminals are protected against bending or short circuiting by tools or other equipment in the hand of a workman, and the workman's hands are protected against damage from the adjacent terminals. In this way, dual protection is achieved.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A one-piece terminal protector for protecting adjacent columns of terminals comprising:

means comprising first and second resilient opposed engagement jaws, both of said engagement jaws resiliently deflecting with respect to each other having outwardly flared lips to permit said engagement jaws to be thrust laterally over a column of terminals and resiliently engaged thereon, said engagement jaws having a centerline upon which they converge to provide a spring engagement force; and means comprising a protection flange extending laterally from one of said jaws at an angle with respect to said centerline for extending over the protecting a column of terminals adjacent to the engaged column of terminals.

2. The device of claim 1 wherein said first and second engagement jaws and said flange are of uniform cross section and unitarily extruded from resilient thermoplastic synthetic composition material.

3. The device of claim 1 wherein said engagement jaws have grip ridges thereon for engagement on both wire-wrapped and bare terminals.

4. The device of claim 3 wherein said flange lies in a plane at an acute angle to said centerline.

5. The device of claim 4 wherein said first and second engagement jaws and said flange are of uniform cross section and unitarily extruded from resilient thermoplastic synthetic composition material.

6. A one-piece terminal protector comprising:

first and second opposed engagement jaws, at least one of said engagement jaws being resiliently deflectable with respect to the other of said engagement jaws to permit said engagement jaws to be thrust over a terminal and resiliently engaged thereon, said engagement jaws having grip ridges thereon for engagement on both wire-wrapped and bare terminals, said engagement jaws having a centerline; and a protection flange extending laterally from one of said jaws at an angle with respect to said centerline to extend over and protect a terminal adjacent to the engaged terminal.

7. The device of claim 6 wherein said device is sufficiently long as to engage over a plurality of terminals arranged in a column, and said flange is sufficiently wide to extend over a plurality of adjacent columns of terminals.

8. The device of claim 7 wherein said flange lies in a plane at an acute angle to said centerline.

9. The device of claim 8 wherein said first and second engagement jaws and said flange are of uniform cross section and unitarily extruded from resilient thermoplastic synthetic composition material.

10. A one-piece terminal protector comprising:

first and second opposed engagement jaws, at least one of said engagement jaws being resiliently deflectable with respect to the other of said engagement jaws to permit said engagement jaws to be thrust over a terminal and resiliently engaged thereon, said engagement jaws having grip ridges thereon for engagement on both wire-wrapped and bare terminals, said engagement jaws having a centerline; and a protection flange extending laterally from one of said jaws at an acute angle with respect to said centerline, said device being sufficiently long to engage over a plurality of terminals arranged in a column, and said flange being sufficiently wide to extend over a plurality of adjacent columns of terminals to protect the adjacent columns of terminals.

11. The device of claim 10 wherein said first and second engagement jaws and said flange are of uniform cross section and unitarily extruded from resilient thermoplastic synthetic composition material.

* * * * *